United States Patent [19]
Sato

[11] Patent Number: 5,589,203
[45] Date of Patent: Dec. 31, 1996

[54] VACUUM KNEADING AND EXTRUDING APPARATUS

[75] Inventor: Takuya Sato, Suita, Japan

[73] Assignee: Sato Iron Works Co., Ltd., Osaka, Japan

[21] Appl. No.: 502,101

[22] Filed: Jul. 13, 1995

Related U.S. Application Data

[63] Continuation of Ser. No. 189,476, Jan. 31, 1994, abandoned.

[30] Foreign Application Priority Data

Nov. 10, 1993 [JP] Japan ................. 5-280777

[51] Int. Cl.$^6$ .................... B29C 47/92; B29C 47/38
[52] U.S. Cl. .................. 425/147; 264/40.4; 264/102; 264/211.11; 264/211.21; 264/211.23; 264/349; 366/82; 425/148; 425/197; 425/199; 425/204; 425/208; 425/382.3
[58] Field of Search ................ 264/40.1, 40.7, 264/40.4, 101, 102, 177.11, 211.11, 349, DIG. 78, 211.21, 211.23; 425/148, 203, 204, 205, 147, 197, 199, 208, 382.3; 366/75, 76, 139, 152, 82

[56] References Cited

U.S. PATENT DOCUMENTS

| | | | |
|---|---|---|---|
| 2,343,829 | 3/1944 | Clayton | 425/205 |
| 3,224,738 | 12/1965 | Tarukawa | |
| 3,572,647 | 3/1971 | Stäheli | |
| 3,638,916 | 2/1972 | Ursic et al. | 366/152 |
| 3,687,288 | 8/1972 | Lynch et al. | 210/84 |
| 3,832,431 | 8/1974 | Matthaei | 264/349 |
| 3,993,722 | 11/1976 | Borcher et al. | 264/102 |
| 4,090,829 | 5/1978 | Fischer et al. | 425/203 |
| 4,125,208 | 11/1978 | Bettermann | 366/75 |
| 4,474,473 | 10/1984 | Higuchi et al. | 366/75 |
| 4,679,498 | 7/1987 | Chaveron et al. | 366/75 |
| 4,738,609 | 4/1988 | Marchesani | 425/308 |
| 4,772,434 | 9/1988 | Myers | 264/211.11 |
| 5,055,027 | 10/1991 | Sato | 425/197 |
| 5,110,521 | 5/1992 | Moller | 425/148 |
| 5,158,725 | 10/1992 | Handa et al. | 264/40.7 |
| 5,213,724 | 5/1993 | Saatkamp | 264/40.4 |

FOREIGN PATENT DOCUMENTS

| | | |
|---|---|---|
| 2438497 | 5/1980 | France . |
| 1451717 | 10/1967 | Germany . |
| 1134453 | 11/1968 | United Kingdom . |

*Primary Examiner*—Mathieu D. Vargot
*Attorney, Agent, or Firm*—Felfe & Lynch

[57] ABSTRACT

A vacuum kneading and extruding method includes the steps of separately and continuously measuring plural types of material and continuously feeding the material into a kneading and degassing tank; kneading the plural types of material fed, and degassing the material by decompressing a material accommodating space into a vacuum; kneading and transporting the material in a decompressed condition through a multi-stage kneading mechanism; and forming and extruding kneaded material in a predetermined shape. An apparatus for use in executing this method is included.

10 Claims, 6 Drawing Sheets

FIG.5
(a) (b)
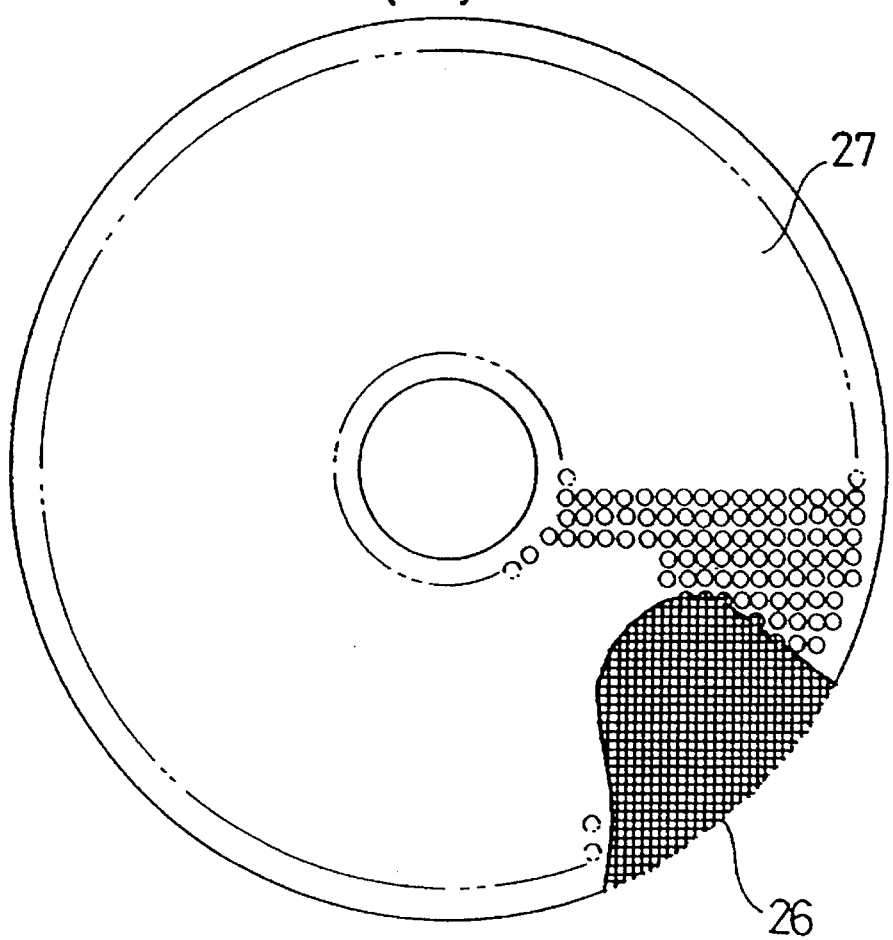
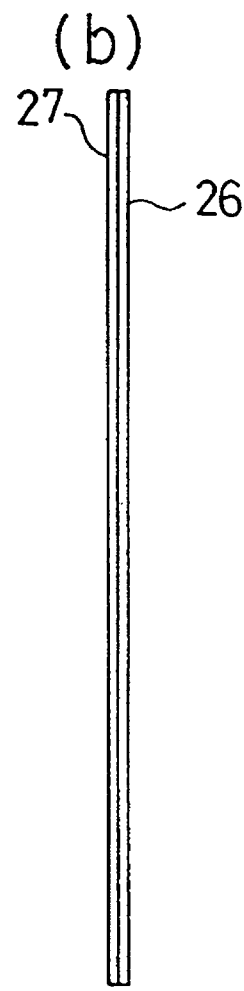

VACUUM KNEADING AND EXTRUDING APPARATUS

This application is a continuation of application Ser. No. 08/189,476, filed Jan. 31, 1994 now abandoned.

BACKGROUND OF THE INVENTION

1. Field of the Invention

This invention relates to a vacuum kneading and extruding method and apparatus. More particularly, the invention relates to an improvement in a vacuum kneading and extruding method for kneading, decompressing and extruding in a predetermined shape, chemical materials such as soap basis or various oils and fats, and to an apparatus for use in executing this method.

2. Description of the Related Art

In a conventional vacuum kneading and extruding method and apparatus, as shown in FIG. 6, plural types of material to be treated are measured separately and intermittently by means of batch type measuring devices 1. The measured materials are suitably mixed in a mixing device 31. The mixture is then supplied in atmospheric condition to a kneading device 32 consisting of a two-stage pelletizer used exclusively to knead the mixture. The kneaded mixture is transported by a conveyor device 33 to a vacuum kneading and extruding device 34 consisting of a two-stage vacuum extruder. Then, the mixture is kneaded again, and extruded in a predetermined shape through a forming mechanism 4. The extruded product is cut by an automatic cutter 5, and stamped by an automatic stamping machine 6.

The conventional vacuum kneading and extruding apparatus noted above uses numerous devices and machines up to the extruding stage. These include the measuring devices for measuring plural types of material, the mixing device for mixing the materials, the kneading device, conveyor device and vacuum extruder. Consequently, the apparatus as a whole requires a very large installation space. This apparatus has a further disadvantage of requiring extensive auxiliary equipment such as electric wiring and air and water piping.

In addition, since the various devices are installed independent of one another, part of the material under treatment could scatter in large quantities or foreign matter and large quantities of air could mix into the material during transfer from one device to a next device.

SUMMARY OF THE INVENTION

The object of the present invention is to provide a vacuum kneading and extruding method, and a vacuum kneading and extruding apparatus having a compact overall construction for use in executing this method, which prevent foreign matters and large quantities of air from mixing into material under treatment, thereby to obtain moldings of uniform quality through an operation in a vacuum.

The above object is fulfilled, according to the present invention, by a vacuum kneading and extruding method comprising the steps of:

separately and continuously measuring plural types of material and continuously feeding the material into a kneading and degassing tank;

kneading the plural types of material fed, and degassing the material by decompressing a material accommodating space into a vacuum;

kneading and transporting the material in a decompressed condition through a multi-stage kneading mechanism; and forming and extruding kneaded material in a predetermined shape.

In a further aspect of the invention, the same object is fulfilled by a vacuum kneading and extruding apparatus comprising measuring devices for separately and continuously measuring and outputting plural types of material; a kneading and degassing tank for kneading the material received from the measuring devices, and decompressing a space for accommodating the material; a grinding and kneading device communicating with the kneading and degassing tank for receiving the material in a decompressed condition from the kneading and degassing tank, and for kneading and transporting the material; and a forming mechanism disposed at a terminal end of the grinding and kneading device for forming and extruding kneaded material in a predetermined shape.

The present invention provides the following functions:

(1) All the steps from measurement to formation are continuously carried out in a single apparatus. This minimizes possibilities of the material under treatment scattering outside, and entry of foreign matters from outside.

(2) Plural types of material are continuously measured and continuously supplied to the kneading and degassing tank. Thus, a continuous and efficient manufacturing process is possible, compared with the case of measuring material in batches and then transferring the material to the kneading step.

(3) The steps from the kneading and degassing step to the extruding step, particularly the kneading step, are carried out in a vacuum condition. This suppresses air mixing into the material under treatment during the grinding and kneading step. The grinding and kneading action under the decompressed condition rather extracts air from the material under treatment, whereby the material is kneaded well to have a firm ground.

(4) The devices for carrying out the steps from measurement to extrusion are integrated to dispense with the conventional kneading device, pelletizer and conveyor. Thus, the entire apparatus has a compact construction.

(5) The simplified and compact apparatus for carrying out the steps from measurement to extrusion requires less wiring and piping to facilitate maintenance.

The measuring step to the grinding and kneading step of the above vacuum kneading and extruding method suppress scattering of the material and mixing of foreign matter and air into the material. As a result, the kneaded material continuously and efficiently forms high quality molding with a firm base.

The vacuum kneading and extruding apparatus according to the present invention, in addition to the above effects, has the advantage of a compact and simplified overall construction. Consequently, this apparatus requires a reduced installation space, and reduced cost of wiring and piping.

The foregoing and other objects, features and advantages of the invention will be apparent from the following more particular description of preferred embodiments of the invention, as illustrated in the accompanying drawings.

BRIEF DESCRIPTION OF THE DRAWINGS

FIGS. 5(a) and 5(b) show a filter portion of the kneading mechanism, in which (a) is a front view and (b) is a side view.

DETAILED DESCRIPTION OF THE PREFERRED EMBODIMENT

A vacuum kneading and extruding method and apparatus according to the present invention will be described in detail with reference to the drawings.

Vacuum Kneading and Extruding Method

The vacuum kneading and extruding method according to the present invention will be described first. Materials feasible for treatment by this method include soap basis, and various oils and fats. Such materials will be collectively called herein material under treatment A.

Figure 1:
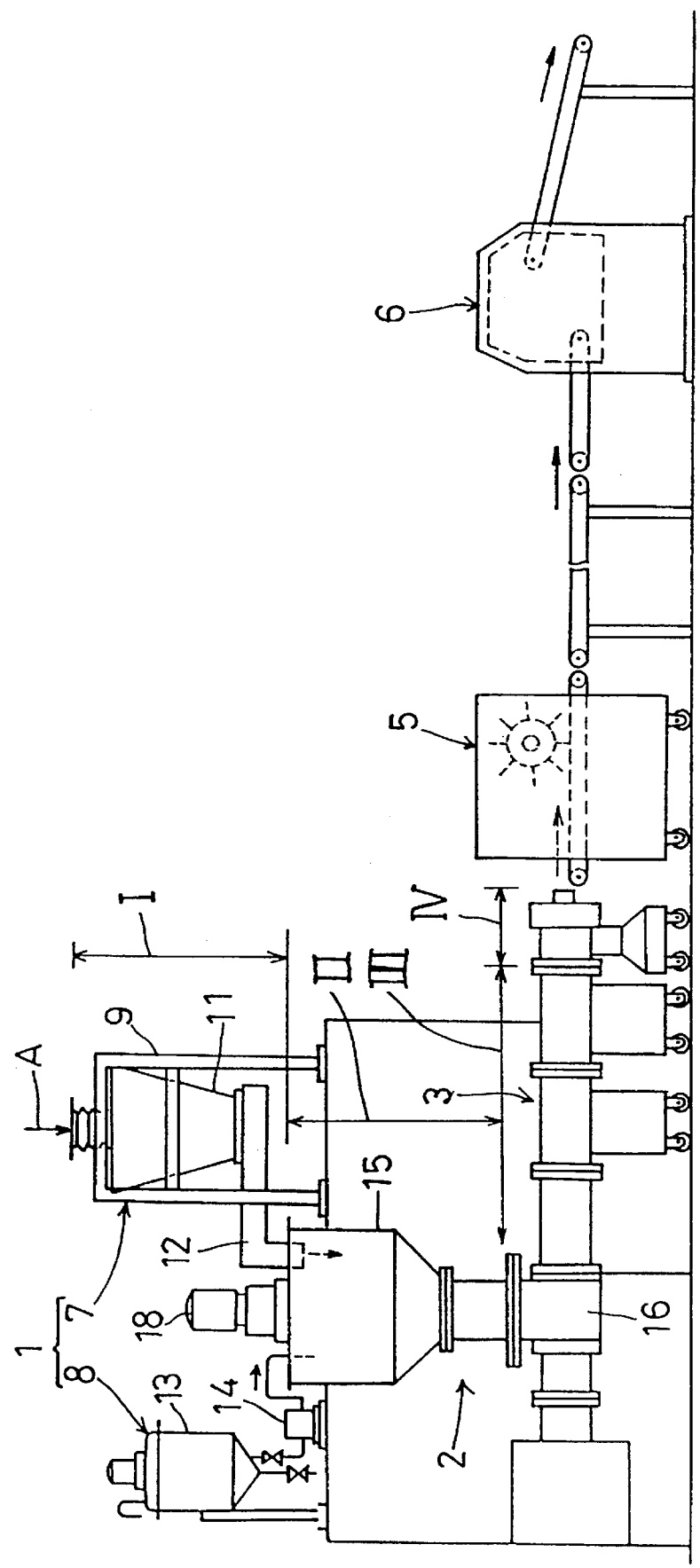
FIG. 1 is an explanatory overall view of a vacuum kneading and extruding apparatus and after-treating devices.

As shown in FIG. 1, the method according to the present invention includes a measuring step for separately and continuously measuring plural types of material and continuously feeding the material into a kneading and degassing tank 2; a kneading and degassing step for kneading the plural types of material fed continuously, and degassing the material by decompressing a material accommodating space to a vacuum; a grinding and kneading step for kneading and transporting the material in a decompressed condition through a multi-stage kneading mechanism; and a forming step for forming and extruding the kneaded material in a predetermined shape. These steps and subsequent steps are carried out in the following sequence [1] to [6]:

[1] Measuring Step (I)

Upstream of the kneading and degassing tank 2 with respect to a feeding direction of material under treatment A, are a first measuring device 7 for measuring and supplying raw basis material, and a second measuring device 8 for measuring and supplying additives such as perfumery and coloring matter. The respective measuring devices 7 and 8 continuously measure predetermined quantities of basis, perfumery and the like, and continuously supply such materials to the kneading and degassing tank 2.

[2] Kneading and Degassing Step (II)

Figure 2:
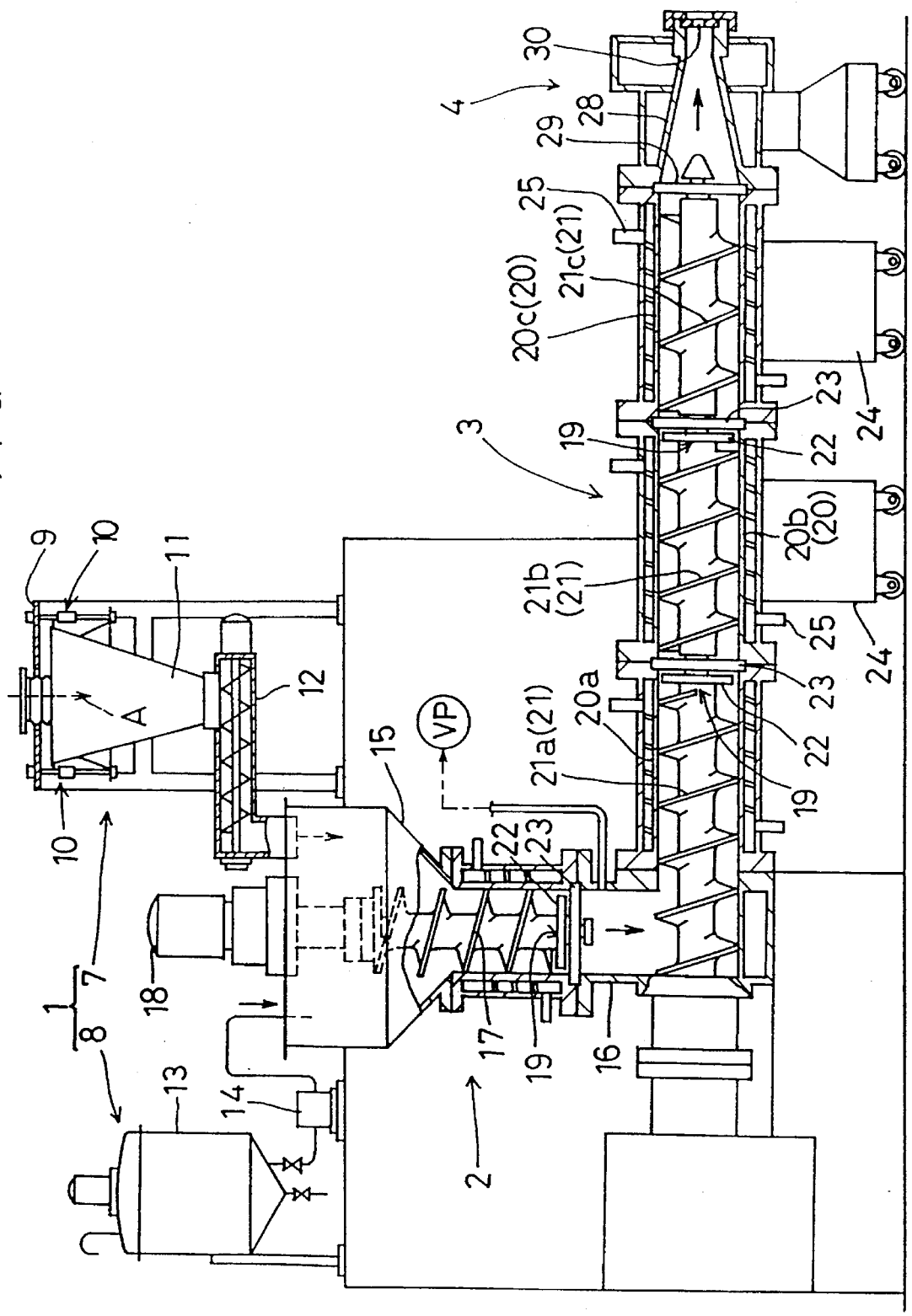
FIG. 2 is an explanatory overall view of the vacuum kneading and extruding apparatus.

As shown in FIG. 2, material A fed into the kneading and degassing tank 2 is kneaded by a kneading screw 17 mounted in the kneading and degassing tank 2 to act as kneading means. Subsequently, the material A is passed to a grinding and kneading device 3 extending from a lower end of the kneading and degassing tank 2. A vacuum chamber 16 is formed below a first kneading mechanism 19 disposed at a lower end of the kneading screw 17 in the kneading and degassing tank 2. The vacuum chamber 16 is connected to a passage extending to a vacuum pump, so that the vacuum chamber 16 defines a decompressing space. Thus, in this decompressing space, the material under treatment A is degassed by decompressing action of the vacuum pump, with fine bubbles and the like removed from the material being kneaded.

[3] Grinding and Kneading Step (III)

As shown in FIG. 2, the grinding and kneading device 3 includes a transport screw 21 mounted in a transport tube 20, and a plurality of kneading mechanisms 19 arranged along a transport path through the transport tube 20. A space in the transport tube 20 communicates with the vacuum chamber 16 disposed below the kneading and degassing tank 2. Consequently, the material under treatment A is transported by the transport screw 21 while being maintained in the decompressed condition, to be subjected to grinding and kneading action.

[4] Extruding Step (IV)

A forming die 30 is fixedly attached to the transport tube 20 to define a downstream end of the transport path of transport screw 21. The material under treatment A is extruded by the transport screw 21 in a predetermined bar shape.

[5] Cutting Step

The material A extruded in the bar shape from the forming die 30 is cut to a predetermined size by a cutting device 5 disposed downstream of the vacuum kneading and extruding apparatus with respect to the material transport direction.

[6] Stamping Step

Each cut piece of the material under treatment A is stamped with a mark, trade name and the like.

Vacuum Kneading and Extruding Apparatus

The vacuum kneading and extruding apparatus according to the present invention is shown in FIGS. 1 through 4.

This vacuum kneading and extruding apparatus includes measuring devices 1 for separately and continuously measuring plural types of material, the kneading and degassing tank 2 for receiving the material A fed from the measuring devices 1, the grinding and kneading device 3 and the forming mechanism 4. Further, the automatic cutting device 5 and automatic stamping device 6 are arranged in series to act as after-treating devices for processing the formed product.

The measuring devices 1 are disposed upstream of the kneading and degassing tank 2 with respect to the feeding direction of material under treatment A, and include the first measuring device 7 for continuously measuring and supplying raw basis material, and the second measuring device 8 for continuously measuring and supplying perfumery, coloring matter and the like.

The first measuring device 7 includes a material feed hopper 11 suspended in a casing 9 through sensor elements 10 such as load cells, and a screw conveyor 12 communicating with a bottom opening of the material feed hopper 11. Material A such as soap base fed from above is continuously measured and continuously supplied in fixed quantities through the screw conveyor 12 to the kneading and degassing tank 2.

The second measuring device 8 includes a raw material tank 13 for storing perfumery, coloring matter and the like as further materials to be treated, and a measuring pump 14 for drawing these materials from the bottom of the raw material tank 13 and feeding the materials to the kneading and degassing tank 2.

The kneading and degassing tank 2 includes a receiving hopper 15 defining a kneading region for kneading the material, and the vacuum chamber 16 defining a degassing region for decompressing kneaded material A advancing toward the grinding and kneading device 3 to remove gases from the material.

The material receiving hopper 15 has the kneading screw 17 disposed centrally of and extending vertically therethrough to knead the material A fed thereto and forcing the material A out through a bottom outlet. The kneading screw 17 has a drive motor 18 mounted on an upper end thereof, and the kneading mechanism 19 disposed at a lower end, which is similar to the kneading mechanisms 19 of the grinding and kneading device 3. The kneading screw 17 forcibly feeds the material downward through the kneading mechanism 19.

The material A is fed from the measuring devices 1 and from the kneading and degassing tank 2 under level control, so that the level of material A constantly lies in a predetermined range inside the receiving hopper 15 of the kneading and degassing tank 2. Though not shown, this level control is effected by level sensors for detecting an upper limit and a lower limit of levels of the material A fed into the receiving hopper 15, and a control device for controlling the screw conveyor 12, measuring pump 14 and kneading screw 17 in response to results of detection by the level sensors.

The vacuum chamber 16 communicating with the bottom of the receiving hopper 15 is connected to the vacuum pump not shown. The bottom of the receiving hopper 15 is closed by the material A fed thereto. Thus, the interior of the vacuum chamber 16 may be used as a decompressing space.

Figure 3:
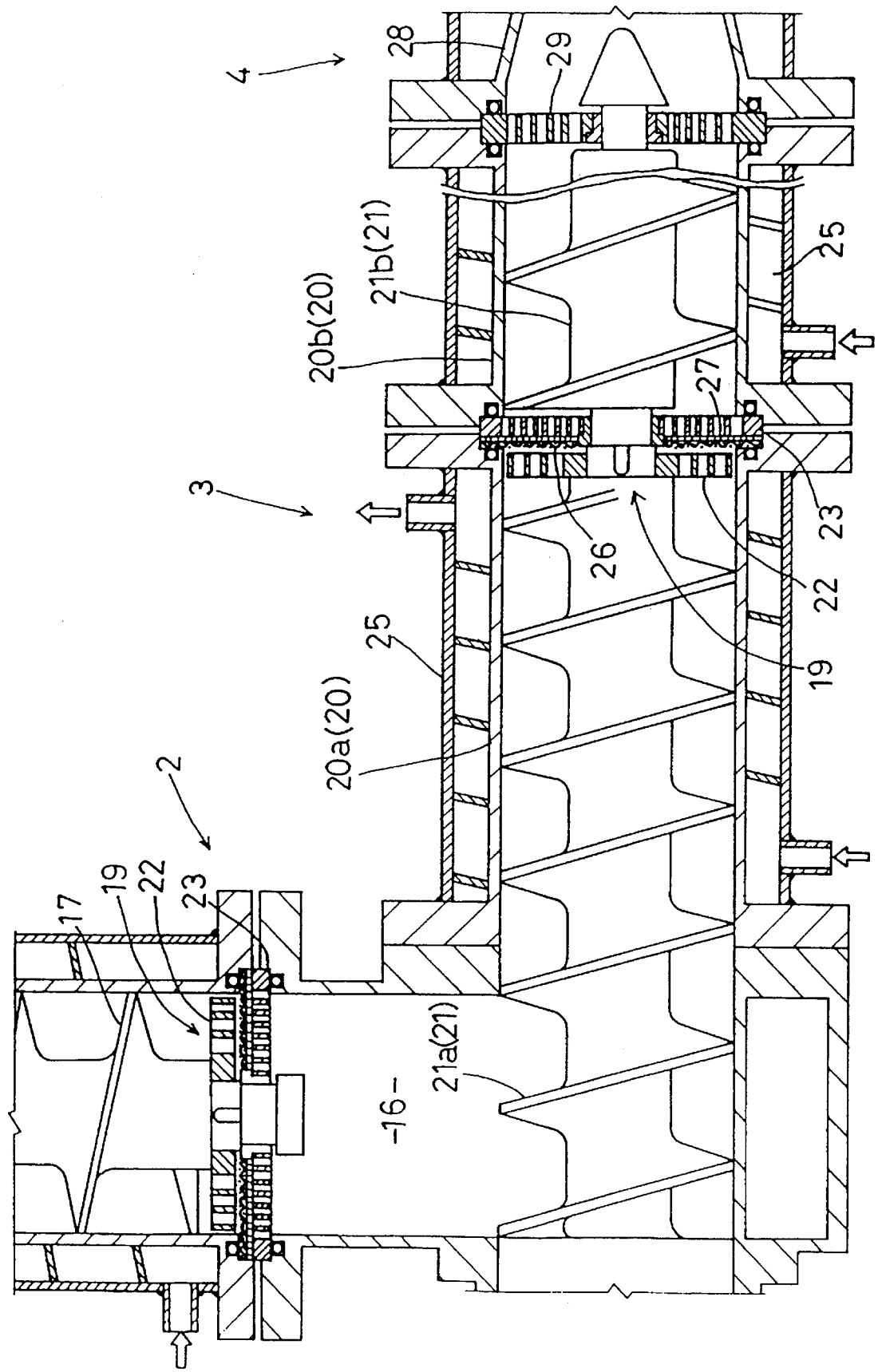
FIG. 3 is an enlarged sectional view showing a portion of a grinding and kneading device.
Figure 4:
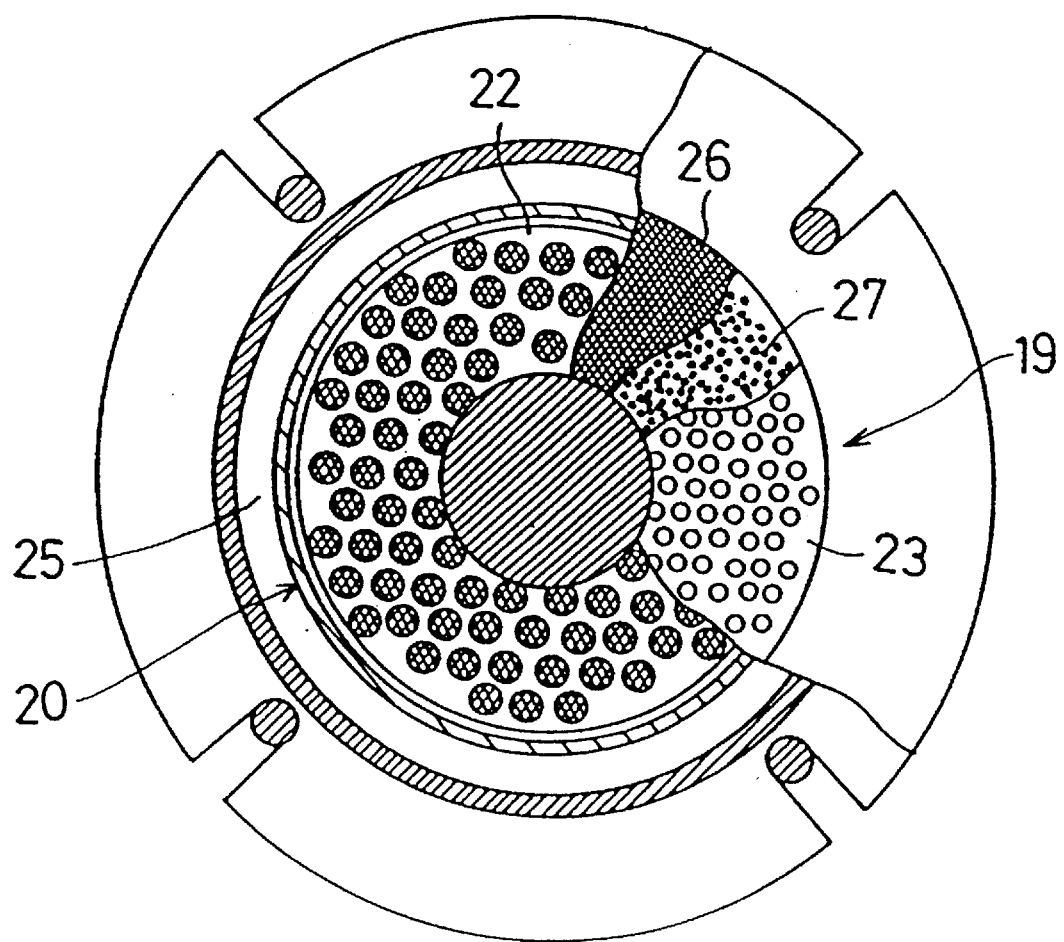
FIG. 4 is a view, partly in section, of a kneading mechanism.
Figure 6:
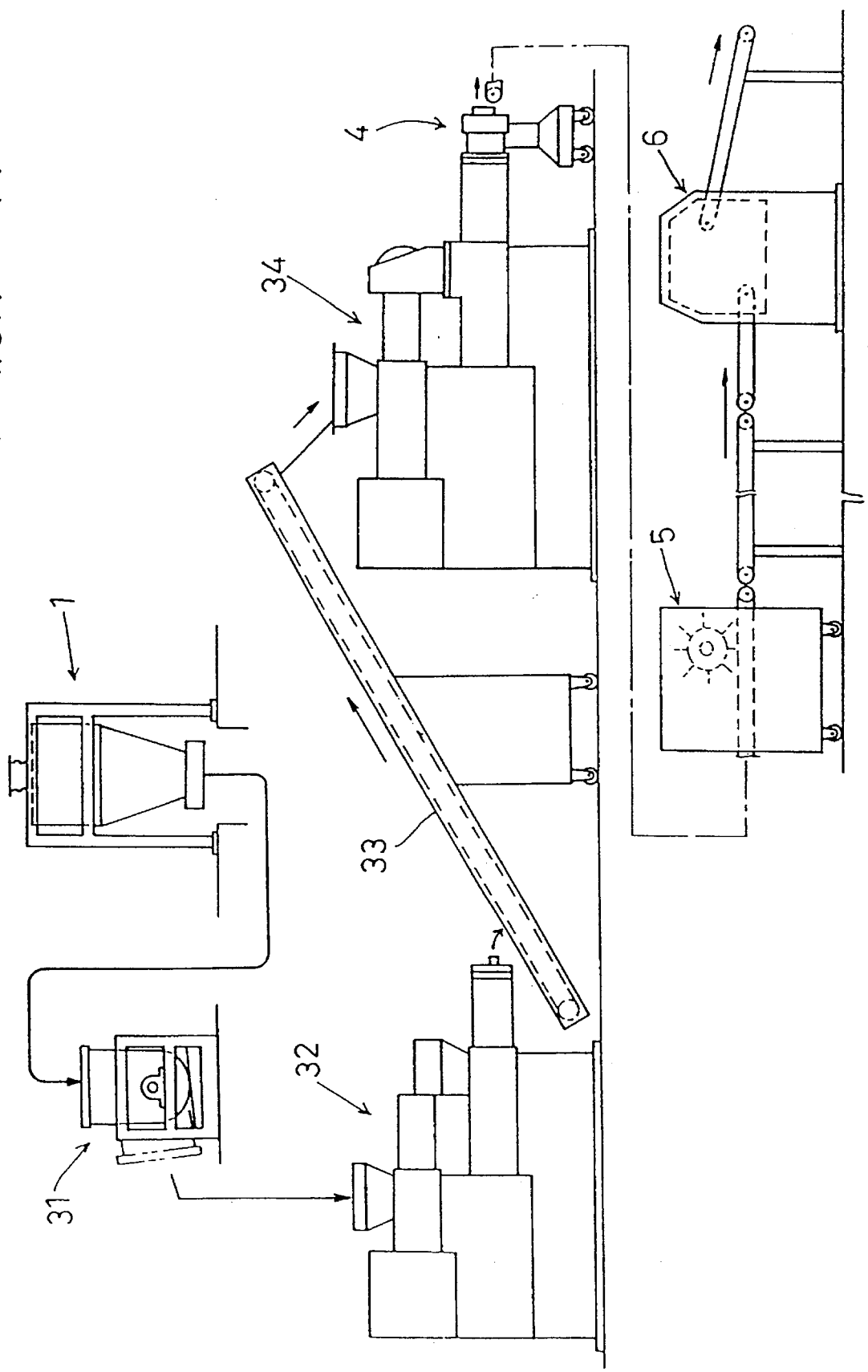
FIG. 6 is an explanatory overall view of a conventional vacuum kneading and extruding apparatus and after-treating devices.

As shown in FIGS. 2 through 4, the grinding and kneading device 3 includes the transport screw 21 mounted in the transport tube 20, and the plurality of kneading mechanisms 19 arranged along the transport path through the transport tube 20. The space in the transport tube 20 communicates with the vacuum chamber 16 disposed below the kneading and degassing tank 2. Thus, the transport tube 20 also is maintained in a decompressed condition by action of the vacuum pump. Consequently, the material A is transported by the transport screw 21 while being maintained in the decompressed condition, to be subjected to grinding and kneading action.

The transport screw 21 includes a first screw 21a, a second screw 21b and a third screw 21c to form multiple stages. The transport tube 20 includes a first, a second and a third cylinders 20a, 20b and 20c for housing the screws 21a, 21b and 21c, respectively. A first, a second and a third kneading mechanisms 19 are interposed between adjacent screws 21a, 21b and 21c and cylinders 20a, 20b and 20c.

The construction of the kneading mechanisms 19 will be described, taking for example the first kneading mechanism 19 disposed between the first screw 21a and second screw 21b. As shown in FIGS. 3 and 4, this kneading mechanism 19 includes a rotatable disk 22 connected to a rear end of the first screw 21a to be rotatable therewith and defining a plurality of bores extending axially of the screw 21, and a fixed disk 23 disposed between the rotatable disk 22 and second screw 21b and defining a plurality of bores extending axially of the screw 21. The bores of the fixed disk 23 have a smaller diameter than those of the rotatable disk 22. The material under treatment A is subjected to strong grinding and kneading action when forced to pass between the fixed disk 23 and the rotatable disk 22 in rotation relative to the fixed disk 23.

The first, second and third screws 21a, 21b and 21c are keyed together to be rotatable in unison. The first screw 21a and rotatable disk 22 also are keyed together.

The fixed disk 23 is fixedly supported in a connection between the first cylinder 20a housing the first screw 21a and the second cylinder 20b housing the second screw 21b. This fixed disk 23 rotatably supports the first screw 21a through a plastic beating.

Numeral 24 in FIG. 2 denotes tables for supporting the second and third cylinders 20b and 20c. Numeral 25 denotes cooling water passages.

Numeral 26 in FIGS. 3 through 5 denotes a mesh disk for filtering the material. Numeral 27 denotes a perforated plate defining a plurality of bores larger than the meshes of the mesh disk 26 and smaller than the bores of the fixed disk 23 as shown in FIGS. 3 through 5. The perforated plate 27 reinforces the mesh disk 26 in relation to the bores of the fixed disk 23, and combines with the mesh disk 26 to filter the material under treatment A.

This filter is opposed to a front surface of the fixed disk 23, with the mesh disk 26 disposed upstream of the perforated plate 27 with respect to the direction of transport of the material under treatment A. A clearance of about 1 to 3 mm is formed between the filter and the rotatable disk 22 disposed upstream thereof. The mesh disk 26 is formed of a metallic material (e.g. SUS 304), and a mesh in the order of #20 to #50 is suited for kneading of soap material. The #20 refers to a mesh having a density defined by a crisscross arrangement of 20 fine strands per inch. The perforated plate 27 is formed of a similar metallic material (e.g. SUS 304), and is about 1.0 mm thick, with a bore diameter of about 0.8 mm and an opening ratio at about 30%, or a bore diameter of about 1.5 mm and an opening ratio at about 40%. The mesh disk 26 and perforated plate 27 are joined at peripheries thereof by suitable joining means such as soldering.

The mesh of the mesh disk 26, the thickness, bore diameter and opening ratio of the perforated plate 27, and the clearance between the filter and rotatable disk 22, are determined as described above because, where soap material is used, the above values readily allow a ratio between omega crystal and beta crystal in the soap material to be in a range well suited for soap. That is, where the mesh, bore diameter, opening ratio and clearance are set to values quite different from the above, the material under treatment A may be kneaded insufficiently to result in a shortage of beta crystals, or may be kneaded excessively to result in a shortage of omega crystals. Soap containing a large quantity of omega crystals does not easily dissolve, while soap containing a large quantity of beta crystals lathers well. Thus, the above values may be selected within the described ranges according to which type of soap is preferred. Advantageously, a plurality of filters providing different values may be prepared for selective use to meet desired ratios between the two types of crystals.

As shown in FIG. 2, the forming mechanism 4 includes a reducing tube 28 connected to the rear end of the third cylinder 20c of the transport tube 20 to be pivotable about a vertical axis between an open position and a closed position, a porous rectifier plate 29 disposed upstream of the reducing tube 28, and a forming die 30 disposed downstream of the reducing tube 28.

The automatic cutting device 5 is disposed downstream of the vacuum kneading and extruding apparatus. This is a known cutting device for cutting the material A extruded in bar form from the forming die 30 to pieces of a uniform size.

The automatic stamping device 6 is a known stamping device disposed downstream of the automatic cutting device 5 to stamp the material A transported thereto with a mark, trade name and the like.

The above embodiment may be modified as follows.

In the above embodiment, the grinding and kneading device 3 includes the transport tube 20 and transport screw 21 each in three, first to third, stages. This is not limitative, but the grinding and kneading device 3 may be in two stages having the first and second cylinders 20a and 20b and the first and second screws 21a and 21b, or may be in four or more stages.

Further, the grinding and kneading device 3 may comprise a double screw type with two (or more) rows of transport tubes 20 and transport screws 21 arranged to treat the material A delivered from the kneading and degassing tank 2 in parallel. In this case, two of the single-screw type filter 5 shown in FIG. 5 may be interconnected at peripheral positions thereof to constitute a double screw type.

The vacuum kneading and extruding apparatus according to the present invention may be used to treat, besides soap material, oils and fats, plastic materials, foodstuffs or drugs.

What is claimed is:

1. A vacuum kneading and extruding apparatus comprising measuring devices for separately and continuously measuring and outputting plural types of material, means for continuously transporting said material downstream from the measuring devices, a kneading and degassing tank comprising a receiving hopper which receives material from said transport means, a kneading screw in said receiving hopper, and a vacuum chamber downstream of said receiving hopper, said kneading screw being rotatable about a vertical axis, a first kneading mechanism disposed between said kneading screw and said vacuum chamber, said first kneading mechanism comprising a rotatable disk fixed to said kneading screw and a fixed disk fixed to said receiving hopper;

means for controlling the level of material in said receiving hopper so that the level of material in said receiving hopper constantly lies in a predetermined range, a transport tube having therein a transport screw for transporting said material downstream from said vacuum chamber; and forming means downstream of said transport tube for forming and extruding the material.

2. A vacuum kneading and extruding apparatus as defined in claim 1, wherein the measuring devices are disposed upstream of the kneading and degassing tank with respect to a feeding direction of the material under treatment, and include a first measuring device for continuously measuring and supplying raw bare material, and a second measuring device for continuously measuring and supplying perfumery and colorants.

3. A vacuum kneading and extruding apparatus as defined in claim 2, wherein the first measuring device includes a material feed hopper suspended in a casing through sensor load cells, and a screw conveyor communicating with a bottom opening of the material feed hopper.

4. A vacuum kneading and extruding apparatus as defined in claim 2, wherein the second measuring device includes a raw material tank for storing perfumery and colorants as further materials to be treated, and a measuring pump for drawing these materials from a bottom of the raw material tank and feeding the materials to the kneading and degassing tank.

5. Apparatus as in claim 1 wherein said means for controlling the level of material comprises upper and lower level limit sensors, and means for controlling the rate of material feed to said receiving hopper in response to signals from said limit level sensors.

6. Apparatus as in claim 5 wherein said means for controlling the level of material further comprises means for controlling the rate of material feed from said receiving hopper in response to signals from said limit level sensors.

7. Apparatus as in claim 1 further comprising a second kneading mechanism between said transport tube and said forming means.

8. Apparatus as in claim 1 wherein said rotatable disc and said fixed disc each have a plurality of axial bores therethrough.

9. Apparatus as in claim 1 wherein said first kneading mechanism further comprises a mesh disc between said rotatable disc and said fixed disc, and a perforated plate disposed downstream of said mesh disc.

10. A vacuum kneading and extruding apparatus comprising:

measuring devices for separately and continuously measuring and outputting plural types of material;

means for continuously transporting said material downstream from the measuring devices;

a kneading and degassing tank comprising a receiving hopper which receives material from said transport means, a kneading screw mounted in said receiving hopper, and a vacuum chamber disposed downstream of said receiving hopper, said kneading screw being rotatable about a vertical axis;

a first kneading mechanism disposed between said receiving hopper and said vacuum chamber, said first kneading mechanism comprising a rotatable disk fixed to said kneading screw and a fixed disk fixed to said receiving hopper;

means for controlling the level of material in said receiving hopper so that the level of material in said receiving hopper constantly lies within a predetermined range, said level controlling means including upper and lower level limit sensors, means for controlling the rate of material fed to said receiving hopper in response to signals from said limit level sensors, and means for controlling the rate of material fed from said receiving hopper in response to signals from said limit level sensors;

a transport tube having therein a transport screw for transporting said material downstream from said vacuum chamber; and forming means disposed downstream of said transport tube for forming and extruding the material.

\* \* \* \* \*